United States Patent [19]

Oetiker

[11] Patent Number: 5,299,344
[45] Date of Patent: Apr. 5, 1994

[54] REINFORCING ARRANGEMENT FOR OPEN HOSE CLAMPS, ESPECIALLY SCREW-TYPE HOSE CLAMPS

[75] Inventor: Hans Oetiker, Horgen, Switzerland
[73] Assignee: Hans Oetiker AG Maschinen- und Apparatefabrik, Horgen, Switzerland
[21] Appl. No.: 923,555
[22] Filed: Aug. 3, 1992

Related U.S. Application Data

[63] Continuation-in-part of Ser. No. 730,071, Jul. 15, 1991, Pat. No. 5,170,540.

[51] Int. Cl.$^5$ .......................................... B65D 63/00
[52] U.S. Cl. ........................................ 24/284; 24/19; 24/281
[58] Field of Search ............... 24/284, 285, 281, 282, 24/280, 274 R, 274 WB, 274 P, 19, 20 R, 279, 20 EE, 20 CW, 275

[56] References Cited

U.S. PATENT DOCUMENTS

| | | | |
|---|---|---|---|
| 832,099 | 10/1906 | Thompson | 24/284 |
| 889,726 | 6/1908 | Sherman | 24/284 |
| 1,522,013 | 1/1925 | Goodall | 24/284 |
| 3,765,066 | 10/1973 | Nitz | 24/284 |
| 4,299,012 | 11/1981 | Oetiker | 24/19 |
| 4,521,940 | 6/1985 | Oetiker | 24/281 |

Primary Examiner—Victor N. Sakran
Attorney, Agent, or Firm—Paul M. Craig, Jr.

[57] ABSTRACT

A clamp structure with a clamping band whose ends are drawn together by a screw-type tightening mechanism that includes a first band tightening member secured near one band end, a second band tightening member secured near the other band end and a screw member for drawing together the first and second tightening members; one of the band tightening members is of at least semi-circular shape and is retained in a loop-like pocket formed by an end portion of the clamping band externally bent back upon itself and secured to the underlying band portion while the other tightening member also of at least semi-cylindrical shape is retained in a loop-like pocket formed by a separate clamping band part whereby the two loop-like pockets are spaced from one another defining a gap; a stepless internal configuration of the clamping surfaces of the clamping band is assured by a tongue-like extension at the inner band portion adapted to engage in a channel-like indentation provided in the outer clamping band portion; to reliably prevent the inner band portion from bulging out into the gap underneath the screw-type tightening mechanism, a separate reinforcing part is provided underneath the gap which on both sides of the gap extends between the inner and outer band portions; the reinforcing part simultaneously performs a guide function to keep the inner and outer band portions aligned in the axial direction.

41 Claims, 2 Drawing Sheets

REINFORCING ARRANGEMENT FOR OPEN HOSE CLAMPS, ESPECIALLY SCREW-TYPE HOSE CLAMPS

FIELD OF THE INVENTION

The present invention, which is a continuation-in-part application of my copending application Ser. No. 07/730,071, filed Jul. 15, 1991, now U.S. Pat. No. 5,170,540, and entitled "Adjustable Screw-Type Clamp", relates to a reinforcing arrangement for hose clamps, especially screw-type hose clamps devoid of any steps along the internal clamping surface thereof.

BACKGROUND OF THE INVENTION

A distinction is made in the art of hose clamps between endless clamps made from tubular stock and open clamps which are adapted to be closed by a mechanical connection. Various types of open hose clamps are known in the prior art, a large number of which have a gap in the circumferential direction formed, for instance, by outwardly extending lobes or ears. These gaps in the circumferential direction of the clamping band represent a source of leakage danger because the hose is likely to be squeezed out into the gap under pressure of the medium carried by the hose. My prior U.S. Pat. No. 3,286,314 suggested in FIG. 5 to cover the gap by extending the inner band portion beyond the gap underneath a so-called "Oetiker" ear. This, however, produced another source of leakage in the form of the step formed at the end of the inner band portion, especially with thin hoses made of hard plastic material. The German Gebrauchsmuster 75 41 277.0 proposed an arrangement in which the inner band portion is fixed to the outer band portion ahead of the ear and a narrow tongue-like extension then covers the gap to engage in a pressed-out groove commencing directly at the opposite leg portion of the ear. The inadequacies stemming from the fact that only a narrow tongue-like extension covers the gap in this publication, were recognized and dealt with by the arrangements disclosed in my prior U.S. Pat. No. 4,237,584 in which the parts were so arranged that the full band width of the inner band portion came to lie underneath the so-called "Oetiker" ear. Further improvements in clamp structures devoid of any gap or step in the internal clamping surface, which proved highly successful, are disclosed in my U.S. Pat. Nos. 4,315,348 and 4,299,012. As the remaining gap under a so-called "Oetiker" ear after contraction thereof is relatively small, the full band width of the inner band portion covering the residual gap is normally adequate with a sufficiently strong clamping band material. However, the possibility of leakage increases with the circumferential length of the gap. The longer the gap, the greater the danger of leakage which results when the inner band portion is forced outwardly into the gap by the forces of the medium carried by the hose. The type of material and its thickness are a significant factor in the costs of the clamps. To reduce these costs, one therefore seeks to use thin clamping band materials as also less costly band materials. These considerations, however, are limited by other factors, such as holding ability and strength of the clamping band material to resist outward deflection into the gap on the part of the inner band portion.

So-called screw-type clamps, as disclosed in my U.S. Pat. No. 4,521,940 and in my aforementioned copending application Ser. No. 07/730,071, the subject matter of which is incorporated herein by reference, normally leave a relatively wide gap in the outer clamping band underneath the screw member of the threaded adjusting mechanism. Reinforcements in the inner band portion in the form of one or more ribs within the area lying underneath this gap, as proposed in my aforementioned copending application improved the holding ability of the inner band portion against outward deflection into the gap. However, even such reinforced inner band sections did not prove completely satisfactory under all operating conditions.

SUMMARY OF THE INVENTION

It is therefore an object of the present invention to provide a hose clamp, especially a screw-type clamp of the type described above which avoids by simple means the aforementioned shortcomings and drawbacks encountered in the prior art.

Another object of the present invention resides in a clamp structure of the type described above which precludes outward deflection of the inner band portion into the gap even in the presence of wider gaps and/or with the use of thinner clamping band material.

A further object of the present invention resides in a screw-type clamp of the type described above which preserves the important feature of an internal clamping surface devoid of any steps or gaps, yet reliably prevents the inner band portion from being squeezed out into the gap.

A still further object of the present invention resides in a hose clamp, especially screw-type clamp of the type described above, which can be manufactured in a simple, cost-effective manner and permits use of existing dies with only minor modifications.

The present invention essentially consists in providing a reinforcing part covering the gap and extending on both sides thereof between the inner and outer band portions of the clamp. This permits selection of a reinforcing part made from any appropriate material such as, for example, made from the same clamping band material as the clamp itself or from another material having different characteristics, such as greater strength and/or thickness than the clamping band material.

According to another feature of the present invention, the reinforcing part serves at the same time to guide the inner and outer clamping band portions with respect to one another during relative movements in the circumferential direction to assure thereby that the inner and outer clamping band portions remain aligned in the axial direction. If according to another feature of the present invention, the reinforcing part is made slightly wider than the clamping band, the guide functions can be assured in a particularly simple manner by radially inwardly and radially outwardly extending rim portions formed at the lateral edges of the reinforcing part which engage both sides of the inner and outer band portions. The reinforcing part may also be connected in a simple manner by substantially radially extending tab-like members extending alongside the edges of the band portion to which the reinforcing part is to be secured and bent over the corresponding band portion to engage with the respective surface thereof. The reinforcing part is preferably connected in this manner with an outer band portion, and in a particularly advantageous manner with the underlying clamping band portion forming a pocket-like loop accommodating a part-cylindrical tightening member so that the bent-over tab-like members come to lie within the space inside the pocket-like loop.

According to still another feature of the present invention, two steps are provided in the outer band portion on opposite sides of the gap which displace the outer band portions outwardly by a distance corresponding at least approximately to the thickness of the reinforcing part.

According to still a further feature of the present invention, the two steps are spaced from one another in the circumferential direction of the clamp structure by a distance at least slightly greater than the circumferential length of the reinforcing part when the clamp structure is in its position corresponding to maximum tightening thereof in order to preserve a truly circular internal clamping surface.

Various types of insert or bridging members have been proposed heretofore in the prior art such as disclosed, for example, in my prior U.S. Pat. Nos. 3,789,463 and 4,312,101 as well as in the prior U.S. Pat. No. 4,365,393 to Hauffe et al. However, these insert members which were intended to bridge the gap either under a so-called "Oetiker" ear or under a screw-type clamp created leakage problems due to the existence of other gaps and/or steps.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein.

DETAILED DESCRIPTION OF THE DRAWINGS

Referring now to the drawing, wherein like reference numerals are used throughout the various views to designate like parts, and more particularly to FIG. 1-9, the screw-type clamp structure in accordance with the present invention, generally designated by reference numeral 20, includes a generally flat clamping band 21 of predetermined width and made from a band material with predetermined thickness such as galvanized steel or stainless steel. One end of the clamping band 21 is bent back upon itself at 22 so as to form a bent-back outer clamping band end portion. A loop 23 is thereby formed intermediate the bent-back portion 22 and the underlying outer band portion 21b of the clamping band 21 to retain a half-cylindrical band tightening member 24 which forms part of the screw-type mechanical tightening device used in the present invention. The half-cylindrical band tightening member 24 is provided with a threaded bore (not shown) for purposes to be explained hereinafter. The outer bent-back end portion 22 may be provided with one or more apertures for engagement by one or more hooks provided in the underlying outer clamping band portion 21b to provide a mechanical connection. The mechanical connection may thereby be formed, for example, by a rivet-type connection as disclosed in my prior U.S. Pat. No. 3,286,314 or may involve one or more support hooks as more fully disclosed in my prior U.S. Pat. No. 4,299,012 in conjunction with or without a guide hook. Additionally, it may also be constituted by a combined guide and support hook as disclosed, for example, in my prior U.S. Pat. No. 4,622,720. In the embodiment of FIGS. 1-9, a rivet-type connection as disclosed in my aforementioned U.S. Pat. No. 3,286,314 is shown for the sake of simplicity, which is schematically and generally indicated in FIGS. 1 and 6 by reference numeral 25. The riveted connection is preferred as a fixed connection for ease of handling and installation which, however, may also be replaced by a spot-welded connection under certain circumstances. The outer band end portion 22 is thereby provided with an elongated slot 29 (FIG. 7) to increase the bending ability of the clamping band within this area and to accommodate the free end of the screw shank portion 42 during final tightening of the clamp by means of the screw-type tightening device generally designated by reference numeral 40. An additional slot-like opening (not shown) is provided within the area of the pocket-like loop 23 to permit extension therethrough of the shank portion 42 and also to increase the bending ability within that area. This additional slot-like opening (not shown) may also extend a predetermined distance into the underlying outer band portion 21b of the clamping band, or a separate further slot-like opening may also be provided as described in my U.S. Pat. No. 4,521,940.

Figures 1, 2, 3, 4, 5, 6, 7, 8, 9:
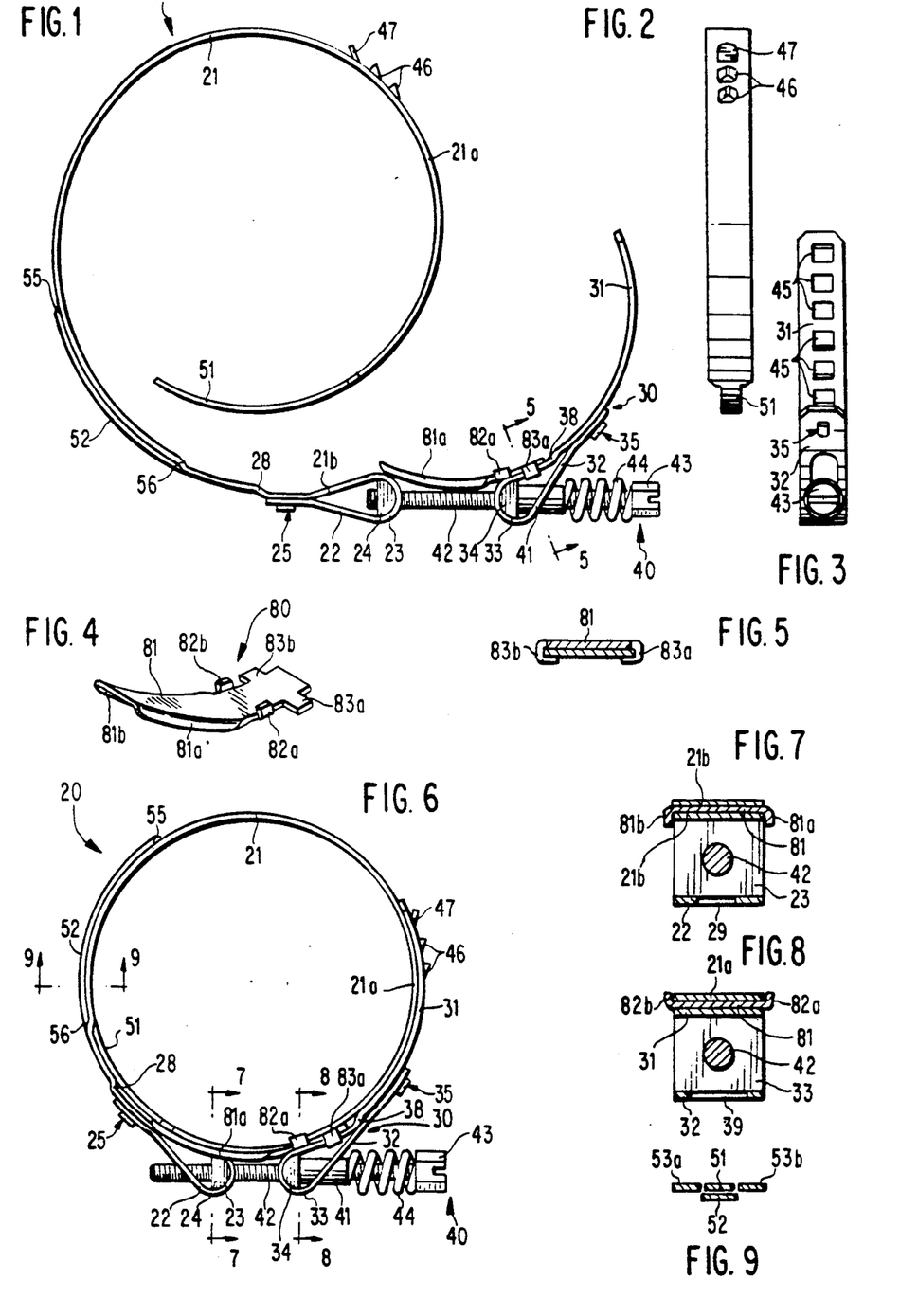
FIG. 1 is an axial elevational view of a screw-type clamp structure with its separate clamping band part not yet assembled to the clamping band and with a reinforcing insert in accordance with the present invention.
FIG. 2 is a right side elevational view on the inner clamping band portion of FIG. 1.
FIG. 3 is a right side elevational view on the separate clamping band part and screw-type tightening mechanism of FIG. 1.
FIG. 4 is a perspective view of the reinforcing part in accordance with the present invention before fastening thereof to the separate clamping band part.
FIG. 5 is a cross-sectional view, taken along line 5—5 of FIG. 1.
FIG. 6 is an axial elevational view, similar to FIG. 1, but showing the various parts assembled into a closed clamp structure with the diametric dimension thereof already reduced by tightening the screw-type mechanism.
FIG. 7 is a cross-sectional view taken along line 7—7 of FIG. 6.
FIG. 8 is a cross-sectional view, taken along line 8—8 of FIG. 6.
FIG. 9 is a cross-sectional view, taken along line 9—9 of FIG. 6.

A separate clamping band part generally designated by reference numeral 30, which forms a continuation of the outer band portion interrupted by the threaded tightening mechanism, includes an inner band portion 31 as well as a bent-back outer end portion 32 forming a pocket-like loop 33 to retain the half-cylindrical band tightening member 34 which is provided with a non-threaded bore (not shown) for purposes to be explained hereinafter. The outer band end portion 32 is provided with one or more apertures for engagement by one or more hooks in the inner band portion 31 to provide a mechanical connection which may be of the same type as the connection between the outer bent-back portion 22 and the underlying inner portion 21a of the clamping band 21. Preferably a single substantially rectangular aperture (not shown) is again provided in the bent-back outer end portion 32 for engagement by a tab-like member extending in the longitudinal direction of the underlying separate clamping band part 31 which is then bent over to provide a rivet-like connection schematically shown and generally designated by reference numeral 35 (FIGS. 1, 3 and 6) as disclosed in my U.S. Pat. No. 3,286,314. As explained in connection with the pocket-like loop 20 and adjoining band portions, longitudinal slots may again be provided in the outer bent-back end portion 32 and in the pocket-like loop 33 to increase the bending ability of the band part within the corresponding areas as also to provide openings for the threaded shank portion 42 of the screw-type tightening device 40, whereby one slot-like opening 39 is shown in FIG. 8.

The screw-type tightening device 40 serves to draw together the open ends of the clamping band 21. For that purpose, the screw-type tightening device 40 includes a threaded shank portion 42 and a screw head 43, preferably a hexagonal screw head 43 (FIG. 3) to facilitate threaded adjustment on the assembly line as also in the after-market by the use of a flexible-shaft screwdriver. A cylindrical sleeve 41 is mounted over the threaded shank portion 42 intermediate the band tightening member 34 and the screw head 43 with interposition of a retightening spring 44 between the cylindrical sleeve 41 and the screw head 43 to provide automatic retightening. The retightening spring 44 may be of any conventional type, such as a coil spring, cup springs and the like. While the through-bore in tightening member 24 is a threaded bore for direct engagement by the threaded shank portion 42 to minimize the weight of the clamp structure, a non-threaded bore in conjunction with a nut may also be used.

The inner band portion 31 of the separate clamping band part 30 is provided with a number of rectangular apertures 45 (FIG. 3) for receiving therein one or more hooks 46, 47 punched out of the clamping band 21 to provide a mechanical connection between the inner band portion 31 of the separate clamping band part 30 and the clamping band 21. The hooks 46 preferably consist of at least two support hooks 46 and a guide hook 47 as disclosed in my prior U.S. Pat. No. 4,299,012.

A tongue-like portion 51 is provided at the free end of the inner clamping band portion 21a of the clamping band 21 which is adapted to engage into a pressed-out channel-like indentation 52 leaving lateral band portions 53a and 53b (FIG. 9) in the band as disclosed in my prior U.S. Pat. No. 4,299,012, the subject matter of which is incorporated herein by reference. These lateral portions 53a and 53b are thereby separated from the bottom of the pressed-out channel-like indentation 52 by one or several longitudinal cuts on each side. A step-like portion 56 in each of the lateral portions 53a and 53b which raises the lateral portions 53a and 53b substantially to the radial height of the channel-like indentation 52 constitutes the beginning of the latter whose end, away from the pocket-like loop 23, is formed by another small step-like portion 55. This arrangement assures a clamping surface completely free of any gaps, discontinuities or steps as more fully disclosed in my prior U.S. Pat. No. 4,299,012.

In order to reliably prevent buckling of the full width inner clamping band portion 21 into the gap underneath the threaded shank portion 42 of the tightening device 40 intermediate the two pocket-like loops 22 and 32, a reinforcing part generally designated by reference numeral 80 is provided in accordance with the present invention which covers the gap underneath the threaded shank portion 42 on the outside of the inner band portion 21a and extends on both sides of the gap between the outer surface of the inner band portion 21a and the inner surface of the outer band portion which, in this case, is formed by the inner surfaces of band portion 21b and by the inner surface of band portion 31 of the separate clamping band part 30. The reinforcing part 80 which may be made from the same material as the clamping band 21 or from any other desired material, for example, from a stronger clamping band material, includes a main planar surface 81 which generally conforms to the curvature to be expected in the screw-type clamp structure. The reinforcing part 80 has a width slightly greater than the width of the clamping band 21 so that its outwardly bent rim portions 81a and 81b extending along a circumferential part thereof can engage with the lateral edges of the outer band portion 21b while its inwardly bent tab-like members 82a and 82b can engage with the lateral edges of the inner band portion 21a to effect a guide function, guiding the inner and outer band portions with respect to one another in the axial direction during relative circumferential movements. The reinforcing part 80 thus performs at the same time a guide function, which obviates other heretofore proposed guide arrangements such as slot in the outer band portion into which extends an outwardly bent hook extending outwardly from the inner band portion. In order to fasten the reinforcing part 80 to another band portion, preferably the inner band portion 31 of the separate band part 30, two additional tab-like members 83a and 83b are provided which are shown in FIG. 6 in the non-bent position and in FIG. 5 in the position in which they are bent radially outwardly and again over the band portion 31 of the separate clamping band part 30. The separate reinforcing part 80 can thus be assembled onto the separate band part 30 during manufacture of the clamp in a simple manner. In order not to disturb the circular inner clamping surface by the presence of the reinforcing part 80, steps 28 and 38 are provided in the clamping band portion 21b and in the band portion 31 of the separate clamping band part 30 which displace the respective clamping band parts radially outwardly by a distance at least approximately corresponding to the thickness of the separate clamping band part. The step-like portions 28 and 38 are thereby spaced from one another in the circumferential direction of the clamp structure by a distance at least slightly greater than the circumferential length of the reinforcing part when the clamp structure is in its position corresponding to maximum tightening thereof. The reinforcing part 80 is so fastened to the band portion 31 that the fastened end of the reinforcing part 30 is positioned close to the correspondingly located step 38 while the other end of the reinforcing part is located at such a distance from the other step 28 that the reinforcing part can move freely toward said other step as the clamp structure is tightened about the object to be fastened thereby. The reinforcing part 80 according to the present invention thus reliably prevents the inner band portion from bulging out into the gap underneath the threaded member while at the same time preserving an inner clamping surface devoid of any steps or gaps which can adapt itself correctly to the circular configuration of a given hose. The use of the reinforcing part in accordance with the present invention thus permits selection of a clamping band material for the clamping band 21 which does not need to take into consideration its strength against bulging out into the gap, particularly as the reinforcing part material can be selected at will, i.e., thicker than the clamping band material. Additionally, if so desired, the inner band portion may be provided with reinforcing grooves or ribs extending radially inwardly or radially outwardly as disclosed in my prior U.S. Pat. No. 4,521,940 or in my aforementioned copending application. However, the reinforcing part according to this invention eliminates for all practical purposes the need for such reinforcing ribs or grooves.

Figures 10, 11, 12:
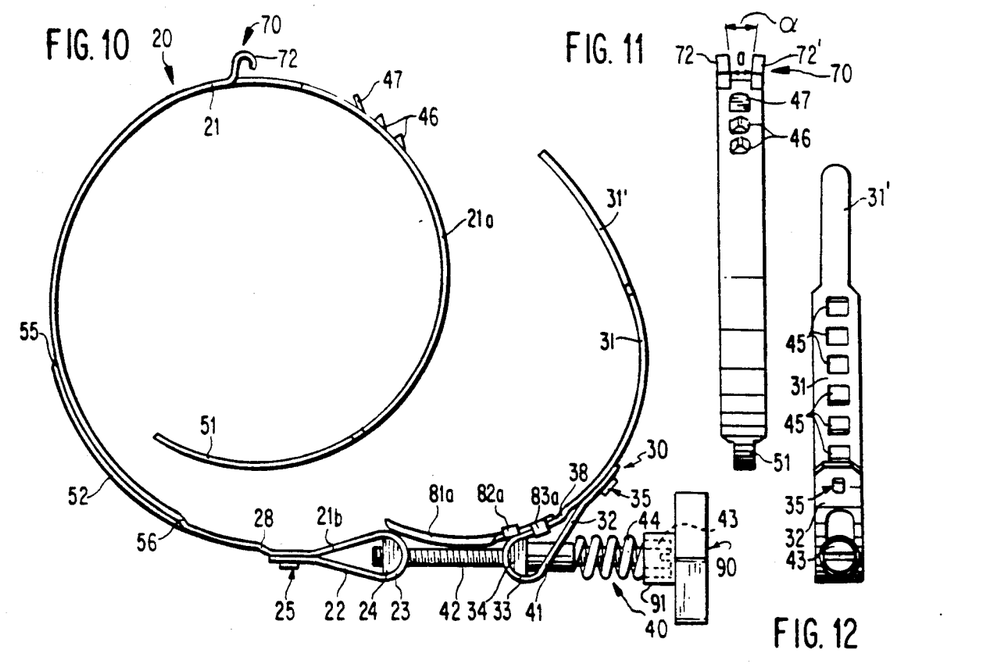
FIG. 10 is an axial elevational view, similar to FIG. 1 and illustrating an improved screw-type clamp structure embodying the improvements of my aforementioned copending application and provided with a reinforcing part according to the present invention.
FIG. 11 is a right side elevational view on the inner clamping band portion of FIG. 10.
FIG. 12 is a right side elevational view of the separate clamping band part and screw-type tightening mechanism shown in FIG. 10.

FIGS. 10 through 13 disclose a screw-type clamp similar to FIGS. 1 through 9 but incorporating the improvements disclosed in my aforementioned copending application. The screw-type clamp structure of FIGS. 10 to 13, in which similar reference numerals are used for corresponding parts of FIGS. 1 through 9, differs from the embodiment of FIGS. 1 through 9 by the provision of a latching device generally designated by reference numeral 70. This latching device 70 eliminates the need for the guide hook 47 in the embodiment of FIGS. 1 through 9 which can now be replaced by a third support hook 46 owing to the hold-down feature of the tongue-like portion 31' of the inner band portion 31 of the separate clamping part 30 by the latching device 70 as will be described more fully hereinafter. The tongue-like extension 31' provided at the free end of the inner band portion 31 of the separate clamping band part 30 is adapted to engage with the latching device 70 which is formed by two short and narrow strips laterally cutout L-shaped from the clamping band 21. The strips are bent up and formed into more or less circular loops 72 and 72' whereby the free ends of these loops are bent toward one another under an angle α as shown in FIG. 11 so as to form in effect a spring-like detent for elastically receiving the tongue-like portion 31' which is of a width slightly greater than the width a (FIG. 11). The tongue-like portion 31' when being pressed-down into the latching device 70, elastically spreads apart the free ends of the loop-like members 72 and 72' and is retained in a detent-like manner close to the outer surface of the clamping band 21. The significant advantage of this detent-like retaining device resides in the fact that the separate band part 30 can no longer swing out but stays in its preassembled shipping condition in which the hooks 46 and 47 engage in the corresponding three apertures nearest the tongue-like extension 31' to provide maximum diametric dimension of the clamp. The clamp is thus reliably held in its preassembled condition with largest possible diametric dimension. As pointed out above, the need for a guide hook 47 now becomes unnecessary so that the guide hook 47 can be replaced by a third cold-deformed support hook 46. During installation of the clamp, one can now effect a stepwise reduction of the clamp to its nearest diametric dimension as required for a given hose. It is necessary only to engage the loop-like portion 33 and the loop-like members 72, 72' either by hand or with the use of a conventional tool, as more fully described in my aforementioned copending application, to draw these parts together so as to effect a stepwise reduction of the diametric dimension of the screw-type clamp after it has been mounted over the hose to its size corresponding nearest to that of the hose. After this stepwise preadjustment corresponding to the existing external dimensions of the hose, the actual tightening operation can then be undertaken by tightening the screw-type device 40. The tightening may thereby be achieved by means of a flexible screwdriver or any appropriate tool such as a pneumatic screwdriver as used on the assembly line. In the alternative, a wing-nut-like thumb-screw of conventional configuration and generally designated by reference numeral 90 may also be mounted over the hexagonal screw head 43 by means of its shank portion 91. If the thumb-screw 90 is made from suitable plastic material, its shank portion 91 has an internal circular bore smaller than the diametric dimensions of the screw head 43 so that the internal bore adapts itself to the external shape of the screw head 43 and thus provides a tight fit when the shank portion 91 is pressed over the screw head. However, the thumb-screw may also be made of any other appropriate material. For example, when made from metallic material such as steel, the internal bore of the shank portion must have a cross section complementary to that of the screw head 43 and of such dimension as to provide a press fit. The thumb-screw 90 may, of course, also be used with the embodiment of FIGS. 1-9.

Though an increase in the number of apertures 45 would increase the adjusting range of a given screw-type clamp, the number of apertures theoretically feasible, however, is limited in practice by a number of considerations, such as the amount of band material required for an increase in the number of apertures 45, the size of the clamp which limits the length of the various band parts and practical considerations as regards clamp design and space requirements which place limitations on the length of the threaded shank portion 42.

With a typical clamp size of nominally 75 mm. containing five apertures 45 in the clamping band portion 31 of the separate clamping band part 30 in screw-type clamps which have been commercially available, hose diameters from the nominal 75 mm. to 69.1 mm. could still be securely tightened. However, a 10 mm. range in the reduction of the diametric dimension of the clamp from its nominal size is required in practice.

It has now been discovered that this range can be realized in a simple manner to provide a diametric dimensional change of 10 mm. of the nominal clamping size by the following measures.

Instead of five apertures 45 as used in the prior commercially available clamps, seven or even more such apertures 45 are now provided in the inner band portion 31 of the separate clamping band part 30. Additionally, the sleeve 41, previously 10 mm. in length is now reduced to 8 mm. Furthermore, the last threads of the threaded shank portion 42 near its free end are deformed after being screwed through the band-tightening member 24 so that the screw-type tightening device 40 can now be opened up more fully without danger of undesired disassembly by unscrewing the screw member 42, 43 until automatically stopped by the deformed threads on the shank portion 42. These measures permit an increase in the screw-adjusting path from 3 mm. to 4 mm. As a result, the desired 10 mm. diametric adjusting range is now feasible by extraordinarily simple means without any major change in the external configuration of the clamp structure.

Additionally, by moving the beginning of the tongue portion 51 by about 5 mm. from its position in the prior commercial screw-type clamp, i.e., by lengthening the inner band portion by about 5 mm., the gap underneath the screw-type tightening device 40 can now be bridged also by the full band width of the inner band portion 21a which in conjunction with the reinforcing part 80 reliably prevent buckling of the inner band portion into this gap.

The guide function of the reinforcing part 80 keep the two parts consisting of inner clamping band portion 21a and of outer clamping band portion 21b as well as of separate clamping band part 30 axially aligned with respect to one another when the clamp is mounted axially over the hose. Additionally, it also assists in keeping the tongue portion 51 in the channel-like indentation 52.

As compared to the prior art commercially available screw-type clamps embodying the invention of my former U.S. Pat. No. 4,521,940, the means 51, 52, 56 and 55 to achieve an inner clamping surface devoid of discontinuities, gaps or steps are displaced further away from the pocket-like loop 24 while the tongue-like portion 51 as well as the channel-like indentation 52 are preferably somewhat lengthened.

The clamp of FIGS. 10–13, preassembled at the manufacturer, can now be installed in a far more convenient manner on the assembly line because the operator can mount the clamp axially over of the object to be fastened without danger of misalignment and/or opening of its parts, can then pretighten the clamp manually in a stepwise manner and can then proceed with final tightening of the clamp by means, for example, of a pneumatic screwdriver with slippage clutch. The complete installation of a clamp in accordance with the present invention can be done therefore in two to three seconds.

However, the clamp in accordance with the present invention which can be mounted axially over the hose in preassembled condition as described above, can also be reopened again without difficulty in case of need. Its reusability is assured thereby in an extraordinarily simple manner. All that is necessary is to insert a small screwdriver or a piece of clamping band underneath the clamping band part 31 within the area of the loop 33 and to slide the same in the direction toward or over the hooks 46, 47 in the direction of the tongue-like portion 31' and slightly move the screwdriver with a twisting motion which then causes the clamp to open up by disengagement of the tongue-like portion 31' from the latching device 70. This reopening, however, preserves the reusability of the clamp.

As already mentioned, the tab-like members 82a, 82b and 83a, 83b as also the bent-up rim portions 81a and 81b perform the important function of guiding the various band portions relative to one another to maintain the axial alignment which, in turn, assures that the tongue-like portion 51 is securely retained in its assigned space in the channel-like indentation 52 during axial assembly. Furthermore, the detent-like latching device 70 not only serves to hold the inner band portion 31 of the separate band part 30 onto the outer surface of the clamping band 21 but additionally serves as abutment in conjunction with the pocket-like loop 34 for the stepwise preadjustment of the clamp, either manually or with a simple tool as disclosed in my copending application.

While an arrangement for achieving an internal clamping surface devoid of a step at the free end of the inner band portion which includes a tongue-like extension at the inner band portion adapted to engage in a pressed-out channel-like indentation, as disclosed in my prior U.S. Pat. No. 4,2909,012 is shown in FIGS. 1 through 13 of this application, the present invention is not so limited. For example, an arrangement as disclosed in my prior U.S. Pat. No. 4,315,348, which includes a tongue-like extension at the inner band portion adapted to engage in a tongue-receiving means formed by an aperture commencing at a step-like portion and extending away from the free end of the outer band portion, may also be used to achieve an internal clamping surface devoid of a step at the free end of the inner band portion. Furthermore, the effect of the step at the free end of the inner band portion may also be eliminated by an arrangement as disclosed in my prior U.S. Pat. No. 4,237,584 in which a tongue-like part at the inner band portion is adapted to engage in a tongue-receiving means in the shape of a U-shaped tongue-receiving configuration formed by inwardly extending embossments in the outer band portion. Of course, a mere reversal of the parts as shown in this patent by the use of a U-shaped tongue-receiving means at the inner band portion, as shown in FIG. 6 of this patent, and a tongue-like part in the form of an inwardly extending embossment in the outer band portion, is also within the purview of the present invention to achieve similar results.

Figures 13, 14:
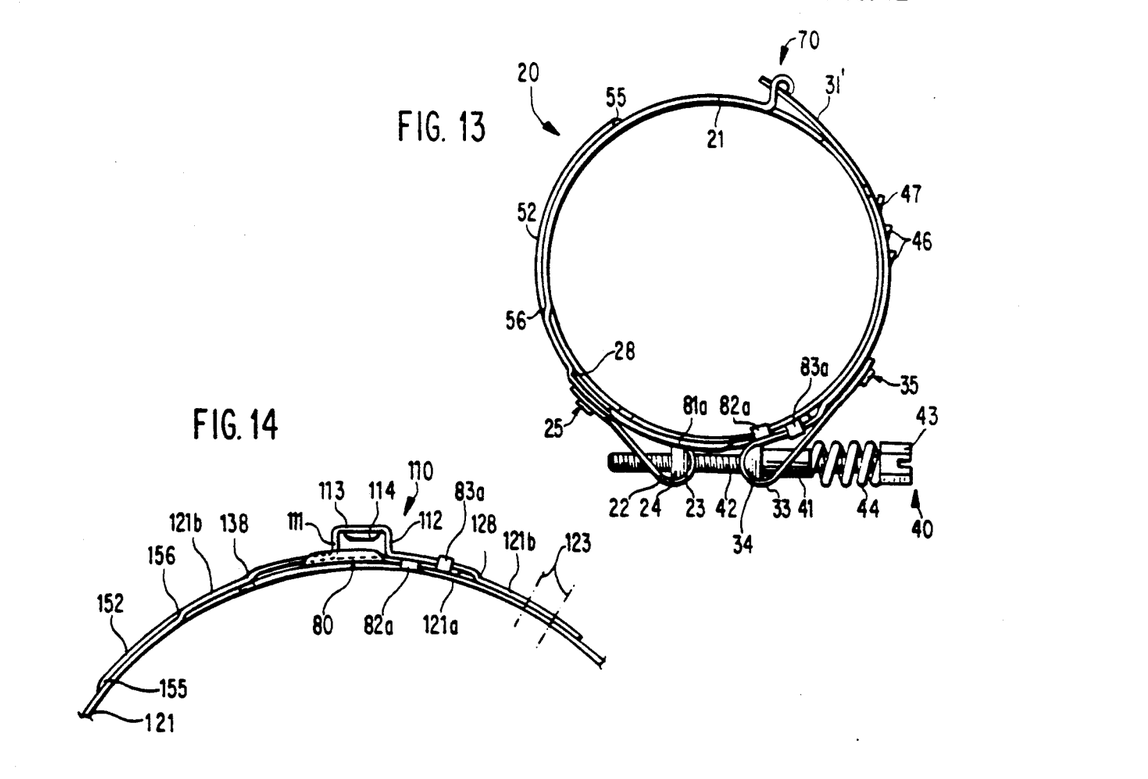
FIG. 13 is an axial elevational view, similar to FIG. 10 and showing the various parts including the reinforcing part in accordance with the present invention in the assembled clamp with an already reduced diametric dimension.
FIG. 14 is a partial axial view of a clamp structure devoid of any steps with a so-called "Oetiker" ear and a reinforcing part in accordance with the present invention.

Though the present invention has particular usefulness in connection with clamp structures having a relatively long gap in the circumferential direction such as screw-type clamp structures, it may also be of utility with clamp structures where the gap is not necessarily as long. For example, clamp structures utilizing so-called plastically deformable "Oetiker" ears are normally expected to result in small gaps between the leg portions of the plastically deformed ear. However, even such gaps vary in size depending on the tolerances of the hoses and increase as the diametric dimensions of the hose increase to allow breathing which is elastically compensated by the plastically deformed ear. The gaps may then pose a problem, especially with the use of thin clamping band material. FIG. 14 illustrates the use of a reinforcing part 80 with a clamp structure which includes in the outer band portion 121b a so-called "Oetiker" ear generally designated by reference numeral 110 which includes generally outwardly extending leg portions 111 and 112 interconnected by a bridging portion 113 which is provided with reinforcing groove 114, preferably a shallow reinforcing depression as disclosed in my copending application Ser. No. 07/821,749, which is a continuation application of my then-copending application Ser. No. 06/922,473, which in turn is a continuation application of my then-copending application Ser. No. 06/622,765. British Patent 2,160,578 corresponds in its disclosure to the three last-mentioned applications. The clamp, only shown in part, is made from a clamping band 121 and includes overlapping inner and outer clamping band portions 121a and 121b, respectively. The inner and outer clamping band portions are connected with each other by a mechanical connection schematically indicated by reference numeral 123 which consists of one or more outwardly extending hooks (not shown) in the inner band portion 121a engaging in apertures (not shown) provided in the outer band portion 121b between its free end and the ear 110. This mechanical connection may be, for example, as disclosed in my prior U.S. Pat. No. 4,299,012, but may also include a combined guide and support hook extending in the longitudinal direction as disclosed in my prior U.S. Pat. No. 4,622,720. To achieve an inner clamping surface devoid of any step at the free end of the inner band portion 121a, the outer band portion 121b is provided within the area of overlap with a pressed-out channel 152 which commences within the area of a first step-like portion 156 and terminates within the area of a second step-like portion 155, as disclosed in my aforementioned U.S. Pat. No. 4,299,012, leaving again lateral band portions on both sides of the channel-like indentation 152 which are raised to the level of the channel-like indentation by the step-like portion 156. According to the present invention, the outer band portion 121b is provided with two additional step-like portions 128 and 138 which perform the functions of the steps 28 and 38 in the embodiment of FIGS. 1 through 9. The reinforcing part 80 is thereby connected at one end thereof with the outer band portion 121b by means of tab-like members corresponding to tab-like members 83a and 83b as disclosed in connection with the embodiment of FIGS. 1 through 9. Additionally, the reinforcing part 80 is again provided with inwardly extending tab-like portions corresponding to tab-like members 82a and 82b and with outwardly extending rim-like portions corresponding to rim-like portions 83a and 83b of FIG. 4 to provide the guide function described above. What was said in connection with the circumferential spacing of steps 28 and 38 equally applies to the spacing of steps 128 and 138.

Of course, the arrangement of a reinforcing part 80 as shown in FIG. 14 may also be used with other types of clamps, such as clamps disclosed in my prior U.S. Pat. Nos. 4,315,348 or 4,237,584 or in connection with tensional spring elements as disclosed in my prior U.S. Pat. No. 3,475,793 or with any other type of clamp in which a gap in the outer clamping band is covered by an extension of the inner band portion. Additionally, the reinforcing part in accordance with the present invention may also be used in connection with the screw-type clamp illustrated in FIGS. 15 through 22 of my copending application Ser. No. 07/730,071 which include auxiliary springs.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An open clamp structure, comprising clamping band means including overlapping inner and outer band portions adapted to be mechanically connected, means for tightening the clamp structure about an object to be fastened thereby, a gap in the outer band portion, said inner band portion extending underneath said gap to cover the same, and means for minimizing the danger of leakage within the area of the gap which results when the inner band portion is displaced outwardly into the gap including a reinforcing part within the area of said gap, and said reinforcing part extending in the circumferential direction beyond said gap on both sides thereof within the radial space formed between the overlapping inner and outer band portions.

2. An open clamp structure according to claim 1, wherein said reinforcing part is fastened to one of said band portions.

3. An open clamp structure according to claim 2, wherein said reinforcing part is fastened in one end area thereof to the outer band portion.

4. An open clamp structure according to claim 3, wherein said outer band portion is provided with outwardly directed steps displacing the outer band portion in an outward direction by a distance corresponding approximately to the thickness of the reinforcing part, and wherein the two steps are spaced from one another in the circumferential direction of the clamp structure by a distance at least slightly greater than the circumferential length of the reinforcing part when the clamp structure is in its position corresponding to maximum tightening thereof.

5. An open clamp structure according to claim 3, wherein outer band portion is provided with two outwardly directed steps displacing the outer band portion in an outward direction by a distance corresponding approximately to the thickness of the reinforcing part.

6. An open clamp structure according to claim 5, wherein the two steps are spaced from one another in the circumferential direction of the clamp structure by a distance at least slightly greater than the circumferential length of the reinforcing part when the clamp structure is in its position corresponding to maximum tightening thereof.

7. An open clamp structure according to claim 6, wherein said reinforcing part is so fastened to the outer band portion that the fastened end of the reinforcing part is positioned close to the correspondingly located step while the other end of the reinforcing part is located such a distance from the other step that it can move freely toward said other step as the clamp structure is tightened about the object to be fastened thereby.

8. An open clamp structure according to claim 7, wherein said reinforcing part is slightly wider than the outer band portion and is provided with substantially radially outwardly extending portions on both sides thereof which are spaced from one another such a distance in a direction transverse to the longitudinal direction of the clamping band means that they are operable to guidingly engage along the lateral edges of the outer band portion.

9. An open clamp structure according to claim 8, wherein said reinforcing part is slightly wider than the inner band portion and is provided with substantially radially inwardly directed tab-like members on both sides thereof which are spaced from one another such a distance in a direction transverse to the longitudinal direction of the clamping band means that they are operable to guidingly engage along the lateral edges of the inner band portion.

10. An open clamp structure according to claim 9, wherein said reinforcing part is slightly wider than the outer band portion in a direction transverse to the longitudinal direction of the clamping band means and is fastened to the outer band portion by at least two substantially radially outwardly directed tab-like members extending along the lateral edges of the outer band portions and bent over the outer surface of the outer band portion.

11. An open clamp structure according to claim 1, further comprising guide means on said reinforcing part for guiding said inner and outer band portions with respect to one another during relative movement in the circumferential direction.

12. An open clamp structure according to claim 11, wherein said guide means include inwardly and outwardly directed lateral members on said reinforcing part operable to engage with lateral edges of the inner and outer band portions, respectively.

13. An open clamp structure according to claim 1, wherein the outer band portion is interrupted and the gap formed thereby is bridged by a screw member forming part of the tightening means.

14. An open clamp structure according to claim 1, wherein said gap is formed by an ear-like means in the outer band portion.

15. An open clamp structure according to claim 14, wherein said ear-like means is plastically deformable and includes generally outwardly extending leg portions interconnected by a bridging portion provided with reinforcing means.

16. An open clamp structure according to claim 1, further comprising means to assure an internal clamping surface devoid of a step at the free end of the inner band portion including tongue-like means and tongue-receiving means formed within the area of the overlapping band portions, wherein said tongue-like means is a tongue-like portion at the inner band portion, and wherein said tongue-receiving means includes an aperture means beginning within the area of a step-like portion in the outer band portion and extending in a circumferential direction away from the free end thereof.

17. An open clamp structure according to claim 1, further comprising means to assure an internal clamping surface devoid of a step at the free end of the inner band portion including tongue-like means and tongue-receiving means, and wherein said tongue-like means is a tongue-like portion at the inner band portion, and wherein said tongue-receiving means is a tongue-receiving channel which commences within the area of a first step-like portion, extending in the central area of the outer band portion away from the free end thereof and terminates in a second step-like portion.

18. An open clamp structure according to claim 1, further comprising means to assure an internal clamping surface devoid of a step at the free end of the inner band portion including tongue-like means and tongue-receiving means, and wherein said tongue-receiving means is formed by a first part of the clamping band means which has an approximately U-shaped configuration and the tongue-like means is formed by a second part which has a tongue-like configuration adapted to engage into the U-shaped first part.

19. An open clamp structure according to claim 18, wherein one of said first and second parts is formed at the end of the inner band portion and the other of said first and second parts is formed by an inwardly pressed-out configuration in the outer band portion.

20. An open clamp structure according to claim 1, wherein said reinforcing part is slightly wider than the outer band portion and is provided with substantially radially outwardly extending portions on both sides thereof which are spaced from one another such a distance in a direction transverse to the longitudinal direction of the clamping band means that they are operable to guidingly engage along the lateral edges of the outer band portion.

21. An open clamp structure according to claim 1, wherein said reinforcing part is slightly wider than the inner band portion and is provided with substantially radially inwardly directed tap-like members on both sides thereof which are spaced from one another such a distance in a direction transverse to the longitudinal direction of the clamping band means that they are operable to guidingly engage along the lateral edges of the inner band portion.

22. An open clamp structure according to claim 1, wherein said reinforcing part is slightly wider than the outer band portion in a direction transverse to the longitudinal direction of the clamping band means and is fastened to the outer band portion by at least two substantially radially outwardly directed tab-like members extending along the lateral edges of the outer band portions and bent over the outer surface of the outer band portion.

23. A screw-type clamp structure, comprising clamping band means having overlapping inner and outer band portions with the outer band portion having two sections interrupted by a gap, and threaded means for tightening the clamp structure about an object to be fastened thereby by reducing the length of said gap including a first member of at least part-cylindrical shape retained in a first pocket-like loop formed in one section of said outer band portion within an area adjacent the gap, a second member of at least part-cylindrical shape retained in a second pocket-like loop formed in the other section of said outer band portion within an area adjacent the gap and a threaded member operatively associated with said first and second members and operable to tighten the clamp by drawing together the first and second members, the inner band portion extending underneath the area of the threaded means to cover the gap, further means within the area of overlap between said inner band portion and one of said sections of the outer band portion to provide a transition substantially devoid of a step in the circumferential direction between the end of the inner band portion and the adjoining band portion of the clamping band means, and reinforcing means including a reinforcing part on the outer surface of the inner band portion, said reinforcing part having a circumferential direction beyond said gap on both sides thereof within the radial space between the outer surface of the inner band portion and the inner surface of the two sections.

24. A screw-type clamp structure according to claim 23, wherein said reinforcing part is secured to one of said sections.

25. A screw-type clamp structure according to claim 23, wherein said two sections are provided with outwardly directed steps displacing the band material thereof by a distance in the radial outer direction which corresponds approximately to the thickness of the reinforcing part.

26. An open clamp structure according to claim 25, wherein the two steps are spaced from one another in the circumferential direction of the clamp structure by a distance at least slightly greater than the circumferential length of the reinforcing part when the clamp structure is in its position corresponding to maximum tightening thereof.

27. A screw-type clamp according to claim 23, further comprising guide means on said reinforcing part for guiding the inner band portion with respect to the outer band portion during relative circumferential movements.

28. A screw-type clamp according to claim 27, wherein said reinforcing part is wider than said clamping band means, and wherein said guide means include inwardly directed and outwardly directed lateral lip portions extending along both lateral edges of the inner and outer band portions.

29. A clamp according to claim 27, wherein the free end of the tongue-like extension is bent to facilitate disengagement of the tongue-like extension from the latching means.

30. A screw-type clamp including clamping band means whose one end is bent back upon itself and secured to the underlying clamping band portion in such a manner as to form a first pocket-like loop accommodating a first, at least part-cylindrical tightening member, said clamping band means terminating at the other end in an inner band portion, a separate clamping band part whose one end is also bent back upon itself to form a second pocket-like loop accommodating a second, at least part-cylindrical tightening member, said first and second pocket-like loops being spaced from one another to leave a gap, threaded means for tightening the clamp including a screw member provided with a screw head and a threaded shank portion extending through the second loop and threadably engaging with the first tightening member in the first pocket-like loop to tighten the clamp by drawing together the first and second tightening members, the inner band portion of the separate clamping band part being secured to the clamping band means, further means including tongue-like means and tongue-receiving means within the area of overlap between said inner band portion and the overlapping clamping band means within the one end area to provide an internal clamping surface substantially devoid of a step, latching means for retaining a tongue-like extension provided at the free end of the underlying band portion of the separate band part at least close to the outer surface of the clamping band means, and reinforcing means including a reinforcing part covering said gap and extending circumferentially on both sides of and beyond the gap within the radial space between said inner band portion, on the one hand, and said one end of the clamping band means and said separate clamping band part, on the other.

31. A clamp according to claim 30, wherein said latching means is formed by two strips laterally cut from the clamping band means which are bent up into the form of a loop-like portions whose free ends slightly converge toward one another so as to provide an entrance width wider than the width of the tongue-like extension and a width near the free ends of the strips that is slightly narrower than the tongue-like extension.

32. A screw-type clamp according to claim 30, wherein the inner band portion of the separate clamping band part is provided with a predetermined number of aperture means for engagement with outwardly extending hook means provided in the clamping band means, and wherein the predetermined number of aperture means are provided for engagement by a number of hook means smaller than the number of aperture means to provide stepwise adjustment of the clamp diameter.

33. A screw-type clamp according to claim 32, further comprising a sleeve member mounted over said threaded member intermediate its screw head and the first tightening member, said sleeve being of predetermined axial length, and the end threads of the threaded member being deformed so that the threaded member can be utilized over nearly its entire length without danger of disassembly of the clamp, whereby an adjusting range is possible which permits the use of discrete clamp sizes accommodating the tolerance ranges encountered in commercially available hoses without having to change clamp size.

34. A clamp according to claim 33, characterized in that the latching means is in the form of a detent-like device adapted to hold down a tongue-like portion provided at the free end of the inner band portion of the separate band part at least close to the outer surface of the clamping band means.

35. A clamp according to claim 33, further comprising spring means in said clamp to provide an automatic retightening force, and wherein said spring means includes a retightening spring mounted over said threaded member between said sleeve member and the screw-head.

36. A clamp according to claim 35, wherein said spring means includes an auxiliary spring structure having a cage means formed by the clamping band means, and at least one convexly shaped auxiliary spring means within said cage means and having free end portions extending through openings in the cage means to engage the latter from the outside, and wherein said cage means includes side portions passing over into bent-back portions by way of convexly shaped connecting portions and wherein the bent-back portions pass over into the clamping band means by way of concavely shaped connecting portions, said openings being provided in said convexly shaped connecting portions, and the free ends of the convexly shaped auxiliary spring mean engaging the concavely shaped connecting portions from the outside thereof.

37. A clamp according to claim 35, wherein the spring means includes an auxiliary spring structure having at least one convexly shaped leaf spring and connecting means connecting the free ends of the leaf spring with corresponding band portions including openings and connecting members, the free ends of the leaf spring being provided with one of openings and connecting members and the corresponding band portions being provided with the other of openings and connecting members.

38. A screw-type clamp structure according to claim 26, wherein two outwardly directed steps are provided within the one end area of the clamping band means and within the said separate clamping band part which displace the band material thereof by a distance in the radial outer direction that corresponds substantially to the thickness of the reinforcing part.

39. An open clamp structure according to claim 38, wherein the two steps are spaced from one another in the circumferential direction of the clamp by a distance at least slightly greater than the circumferential length of the reinforcing part when the clamp structure is in its position corresponding t maximum tightening thereof.

40. A screw-type clamp according to claim 26, further comprising guide means on said reinforcing part for axially guiding the inner band portion with respect to the outer band portion during relative circumferential movements.

41. A screw-type clamp according to claim 40, wherein said reinforcing part is wider than said clamping band means, and wherein said guide means include inwardly directed and outwardly directed lateral lip portions extending along both lateral edges of the inner and outer band portions.

* * * * *